(12) United States Patent
Okamoto

(10) Patent No.: US 6,582,844 B2
(45) Date of Patent: Jun. 24, 2003

(54) METHOD OF COOLING A FUEL CELL

(75) Inventor: Takafumi Okamoto, Koshigaya (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 53 days.

(21) Appl. No.: 09/746,820

(22) Filed: Dec. 22, 2000

(65) Prior Publication Data
US 2001/0051292 A1 Dec. 13, 2001

Related U.S. Application Data

(62) Division of application No. 09/029,733, filed as application No. PCT/JP96/02428 on Aug. 29, 1996, now Pat. No. 6,180,273.

(30) Foreign Application Priority Data

Aug. 30, 1995 (JP) ............................................. 7-221869

(51) Int. Cl.[7] ............................................... H01M 8/04
(52) U.S. Cl. ......................................................... 429/26
(58) Field of Search ............................... 429/26, 34–39, 429/12, 13

(56) References Cited

U.S. PATENT DOCUMENTS

| 3,881,956 A | 5/1975 | Williams |
| 5,858,567 A | 1/1999 | Spear, Jr. et al. ............. 429/12 |

FOREIGN PATENT DOCUMENTS

| JP | 60-038127 A | * 2/1985 | |
| JP | 61-198571 | 9/1986 | |
| JP | 2-50963 | 4/1990 | |
| JP | 5-021076 | 3/1993 | |
| JP | 6-267567 | 9/1994 | |
| JP | 6-333580 | 12/1994 | |
| JP | 07-142078 | * 6/1995 | |
| JP | 08-130028 | * 5/1996 | |
| JP | 8-167424 | 6/1996 | |
| WO | 94/15377 | 7/1994 | |

OTHER PUBLICATIONS

European Search Report Communication for EP 96928695 Application dated Apr. 5, 2001.
English Language Abstract of JP 5–21076.
English Language Abstract of JP 8–130028.
English Language Abstract of JP 8–167424.
English Language Abstract of JP 6–267567.
English Language Abstract of JP 6–333580.

* cited by examiner

*Primary Examiner*—Patrick Ryan
*Assistant Examiner*—Susy Tsang-Foster
(74) *Attorney, Agent, or Firm*—Lahive & Cockfield, LLP

(57) ABSTRACT

A fuel cell is of a simple structure for preventing a partial temperature difference from being developed in a fuel cell structural body, and maintaining an effective operative area and performance. The fuel cell 10 includes a plurality of fuel cells 20 each sandwiched between separators 40, and has circulatory passages 29a, 29b defined therein for circulating cooling water, which has been used to cool the fuel cells 20, along opposite sides of electric generation sections 28 of the fuel cells 20.

13 Claims, 9 Drawing Sheets

METHOD OF COOLING A FUEL CELL

This application is a divisional of U.S. patent application Ser. No. 09/029,733, filed Feb. 26, 1998, now U.S. Pat. No. 6,180,273, which is a 371 filing of PCT/JP96/02428, filed Aug. 29, 1996, which claims priority to Japanese Patent Application No. 7-221869, filed Aug. 30, 1995.

TECHNICAL FIELD

The present invention relates to a fuel cell having an electrolyte membrane sandwiched between an anode electrode and a cathode electrode.

BACKGROUND ART

Solid polymer electrolyte fuel cells comprise a plurality of stacked fuel cell structural bodies (unit cells) each comprising an electrolyte membrane in the form of an ion exchange membrane and a catalytic electrode and a porous carbon electrode which are disposed one on each side of the electrolyte membrane, and a plurality of separators sandwiching the structural bodies.

Hydrogen supplied to the anode of the fuel cell is converted into hydrogen ions on the catalytic electrode, which move through the electrolyte membrane that has been humidified to an appropriate extent toward the cathode of the fuel cell. Electrons generated while the hydrogen ions are moving are transferred to an external circuit for use as direct-current electric energy. An oxygen containing gas such as an oxygen gas or air is supplied to the cathode electrode to generate water through a reaction between the hydrogen ions, the electrons, and the oxygen on the cathode electrode.

For such a fuel cell, there has been known a structure which, as shown in FIG. 11 of the accompanying drawings, comprises fuel cell structural bodies 2 and separators 4 which are alternately stacked together, each of the fuel cell structural bodies 2 having an electric generation section (electrode) 2a which is supplied with cooling water in a direction parallel to the flow of a fuel gas, e.g., a hydrogen gas and an oxygen containing gas, e.g., an oxygen gas.

Since the cooling water flows vertically in the electric generation section 2a, a relatively large temperature difference is developed between central and opposite side regions of the electric generation section 2a due to thermal diffusion. Because of a drop in the temperature, moisture is condensed in the opposite side regions of the electric generation section 2a, creating inoperative regions in the electric generation section 2a. In addition, the electric generation section 2a tends to have low-performance regions on account of the low temperature. As a result, the electric generation section 2a has its effective operative area and performance greatly lowered.

It is an object of the present invention to provide a fuel cell which will solve the above problems and has a simple structure for preventing partial temperature differences from being developed in fuel cell structural bodies thereby to maintain an effective operative area and performance.

SUMMARY OF THE INVENTION

According to the present invention, a cooling medium, which has been used to cool an electric generation section of a fuel cell structural body, is then circulated along outer sides of the electric generation section. Therefore, the cooling medium whose temperature has been increased by a heat exchange in the electric generation section flows outside of the electric generation section. Consequently, any temperature difference between a central region of the electric generation section and outer edges thereof is minimized, thereby preventing moisture condensation and increasing an effective operative area and the performance of the electric generation section.

DETAILED DESCRIPTION OF THE INVENTION

Figure 1:
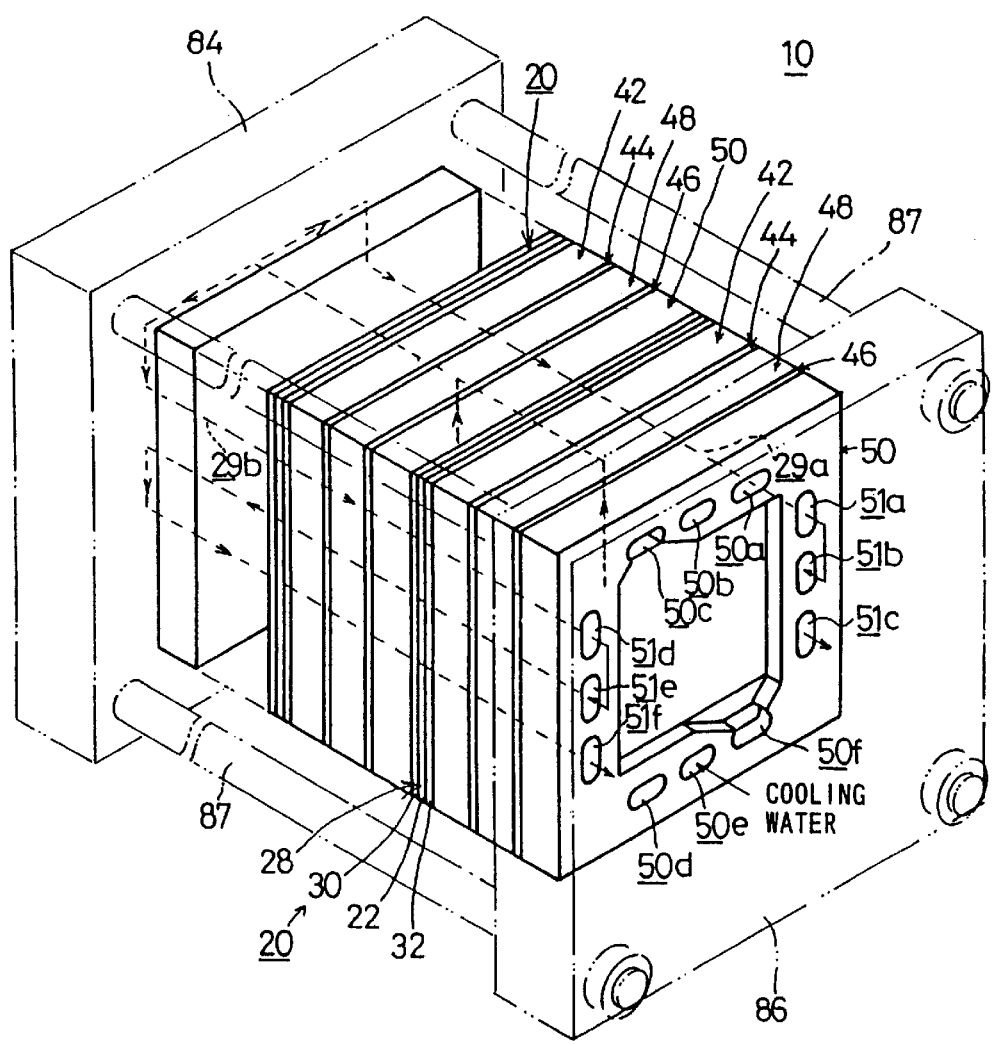
FIG. 1 is a fragmentary perspective view of a fuel cell according to the present invention.
Figure 2:
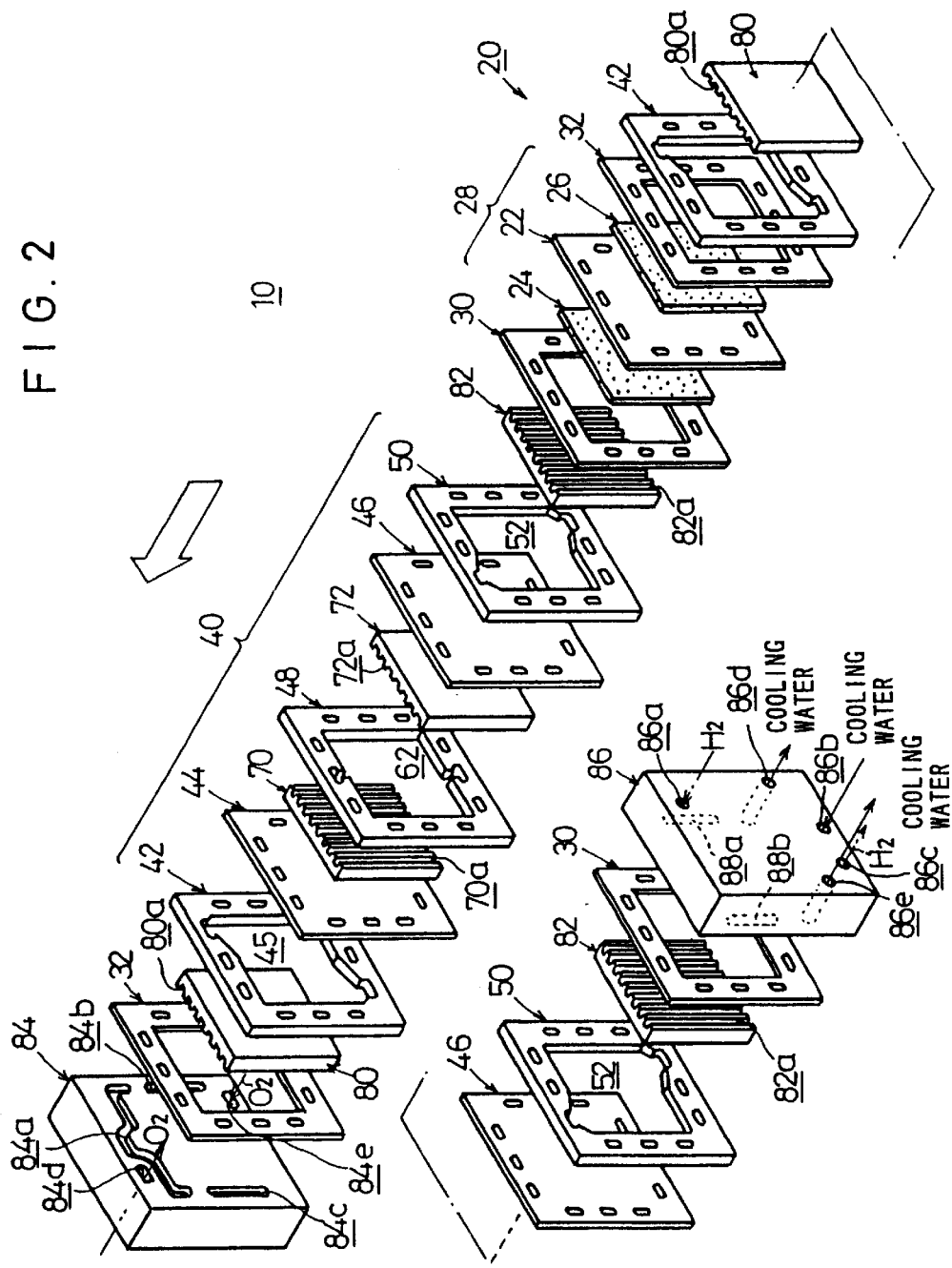
FIG. 2 is an exploded perspective view of the fuel cell.

As shown in FIGS. 1 and 2, a fuel cell according to the present invention basically comprises a horizontal stack of fuel cells (fuel cell structural bodies) 20. Each of the fuel cells 20 includes an electric generation section 28 which comprises an anode electrode 26 and a cathode electrode 24 which sandwich a solid polymer electrolyte membrane 22 therebetween. The electric generation section 28 is described in detail in International laid-open publication WO94-15377, which is incorporated herein by reference. In FIG. 2, the solid polymer electrolyte membrane 22, the anode electrode 26, and the cathode electrode 24 are separate from each other. However, they may be of an integral structure.

Figure 3:
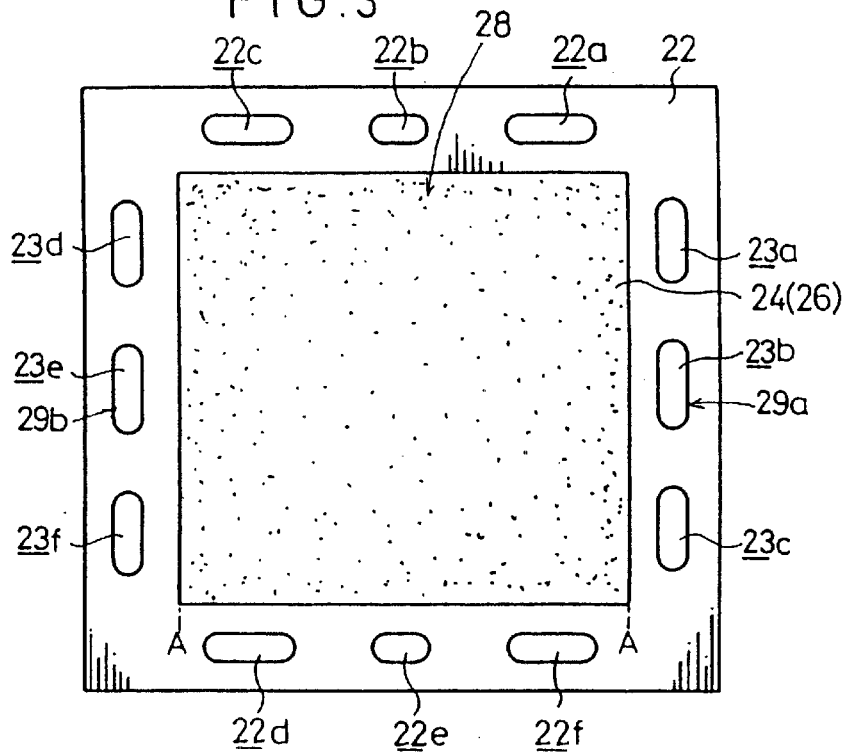
FIG. 3 is a front elevational view of an electric generation section of the fuel cell.

As shown in FIG. 3, the solid polymer electrolyte membrane 22 has an oblong hole 22a for passing a fuel gas such as a hydrogen gas or the like in one direction, a hole 22b for passing cooling water, and a hole 22c for passing an oxygen containing gas, e.g., an oxygen gas, with the holes 22a, 22b, 22c being defined in an upper portion of the solid polymer electrolyte membrane 22. The solid polymer electrolyte membrane 22 also has a hole 22d for passing the fuel gas, a hole 22e for passing the cooling water, and a hole 22f for passing the oxygen containing gas, with the holes 22d, 22e, 22f being defined in a lower portion of the solid polymer electrolyte membrane 22. The solid polymer electrolyte membrane 22 further has holes 23a–23c, 23d–23f defined in opposite side regions thereof and providing circulatory passages 29a, 29b for circulating the cooling water (cooling medium) which has been used to cool the electric generation section 28 along outer edges of the electric generation section 28.

Figure 4:
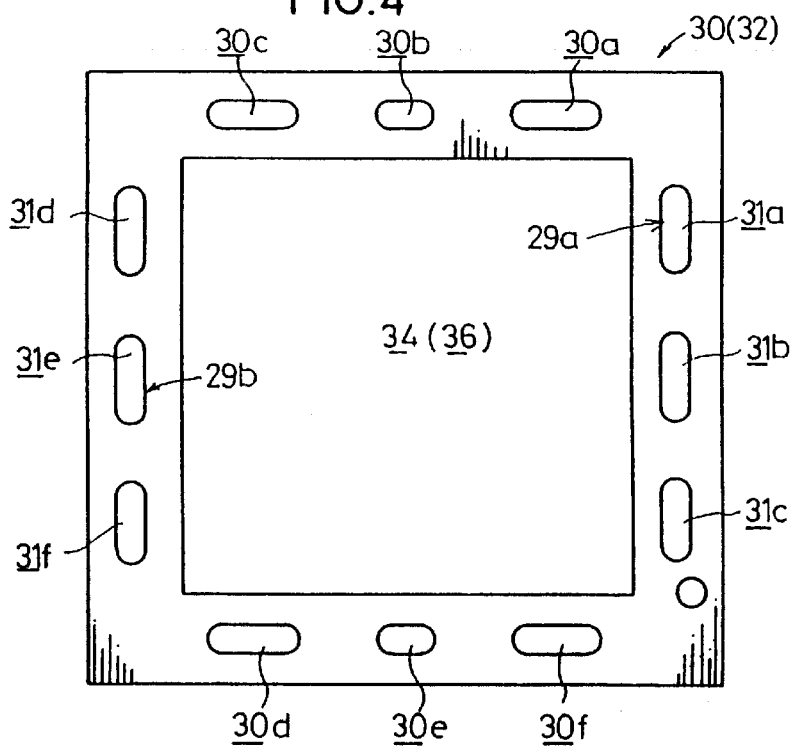
FIG. 4 is a front elevational view of a gasket of the fuel cell.

A first gasket 30 and a second gasket 32 are disposed one on each side of the electric generation section 28. As shown in FIG. 4, the first gasket 30 has a large opening 34 for accommodating the cathode electrode 24 therein, and the second gasket 32 has an opening 36 for accommodating the anode electrode 26. As with the solid polymer electrolyte membrane 22, the first gasket 30 has holes 30a, 30d for passing the fuel gas, holes 30b, 30e for passing the cooling water, and holes 30c, 30f for passing the oxygen containing gas, these holes being defined respectively in upper and lower end portions of the first gasket 30. The first gasket 30 also has holes 31a–31c, 31d–31f defined in opposite side regions thereof and serving as the circulatory passages 29a, 29b. The second gasket 32 is of the same structure as the first gasket 30.

The fuel cell 20 is sandwiched by separators 40. As shown in FIG. 2, each of the separators 40 comprises a first manifold plate 42, a first surface pressure generating plate 44 held against the first manifold plate 42, a second surface pressure generating plate 46, a separator body 48 sandwiched between the first surface pressure generating plate 44 and the second surface pressure generating plate 46, a second manifold plate 50 held against the second surface pressure generating plate 46.

Figure 5:
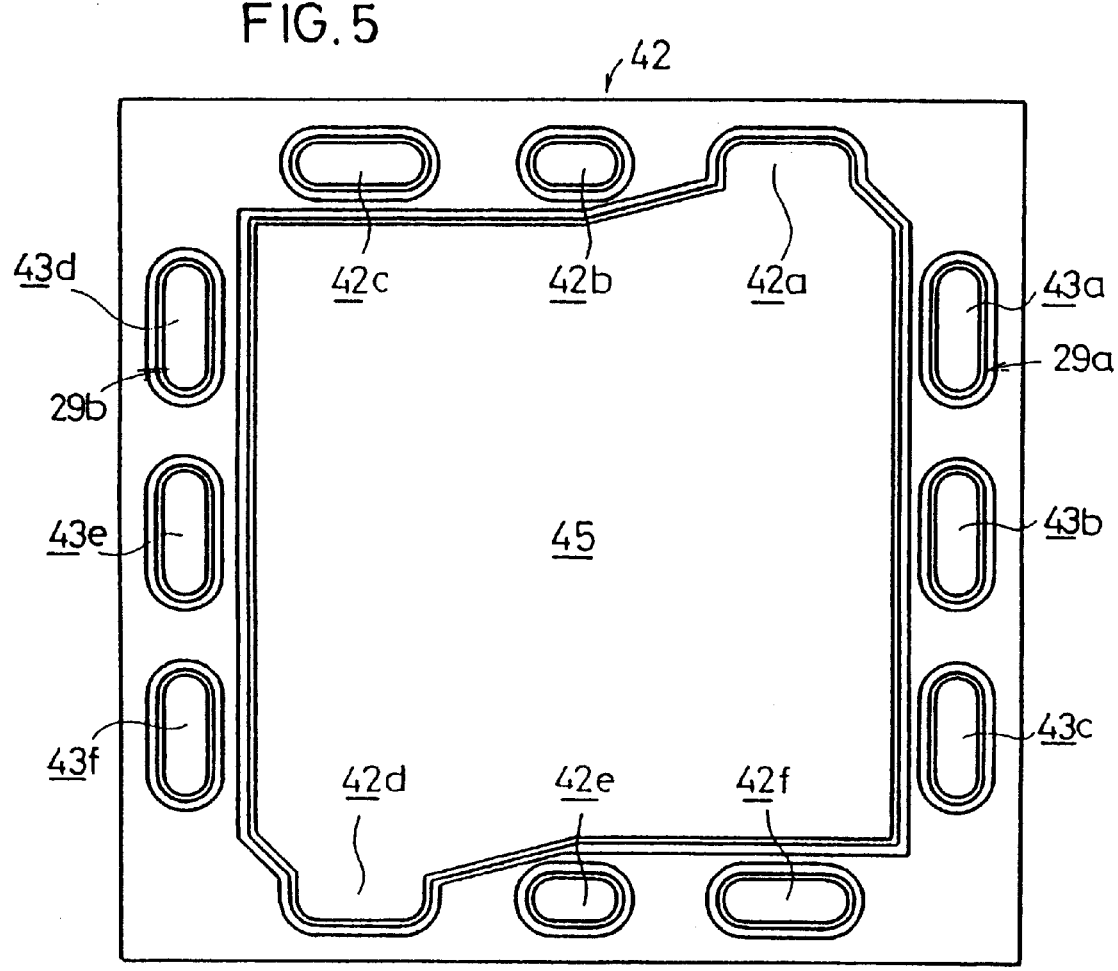
FIG. 5 is a front elevational view of a first manifold plate of the fuel cell.

As shown in FIG. 5, the first manifold plate 42 comprises a rectangular flat plate, and has a fuel gas supply recess 42a defined in an upper right corner thereof for supplying the fuel gas and a cooling water discharge hole 42b defined therein adjacent to the fuel gas supply recess 42a for discharging the cooling water. The first manifold plate 42 also has an oxygen containing gas supply hole 42c defined in an upper left corner thereof for supplying the oxygen containing gas, and a fuel gas discharge recess 42d defined in a lower left corner thereof for discharging the fuel gas. The first manifold plate 42 further has a cooling water supply hole 42e and an oxygen containing gas discharge hole 42f defined therein and spaced successively from the fuel gas discharge recess 42d toward a lower right corner thereof. The fuel gas supply recess 42a and the fuel gas discharge recess 42d are held in communication with each other through an opening 45 which accommodates a fuel gas flow rectifying plate 80, described later on. The first manifold plate 42 also has holes 43a–43c, 43d–43f defined in opposite side regions thereof and serving as the circulatory passages 29a, 29b.

Figure 6:
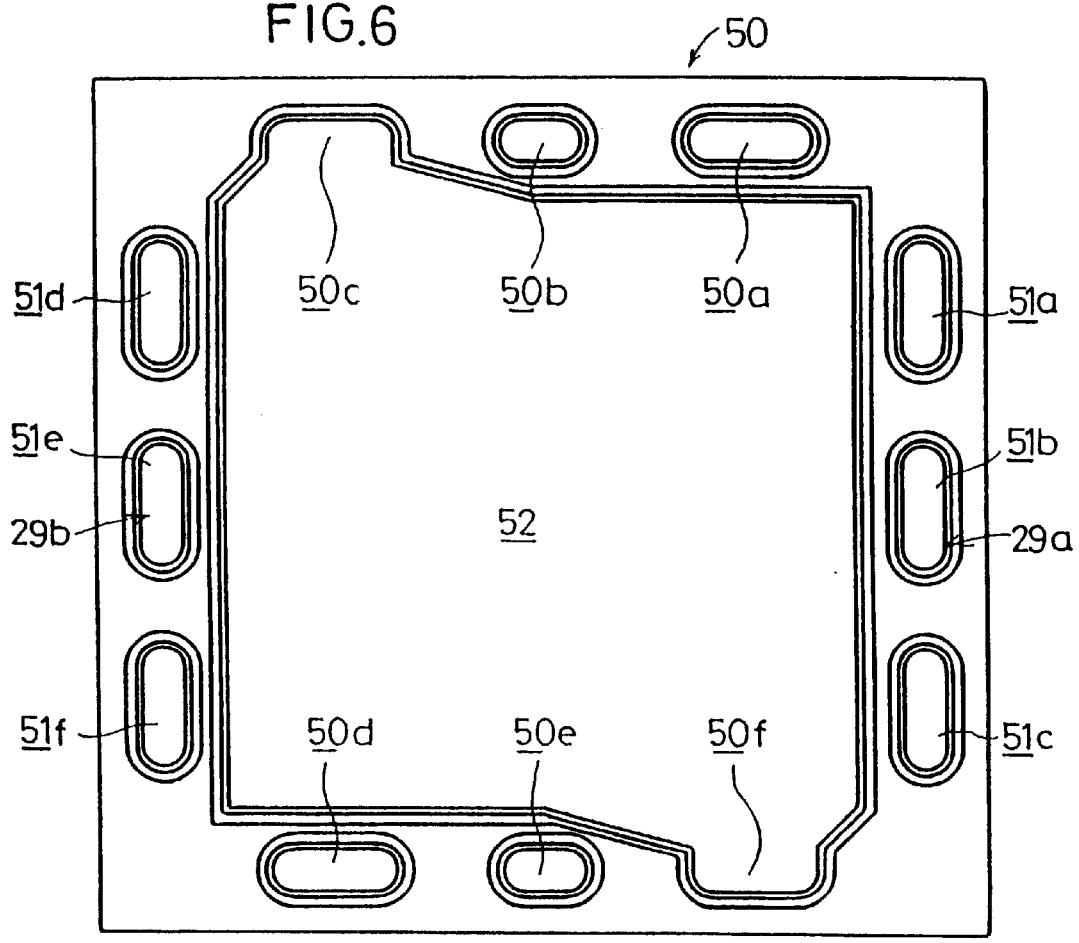
FIG. 6 is a front elevational view of a second manifold plate of the fuel cell.

As shown in FIG. 6 the first manifold plate 42 and the second manifold plate 50 are basically mirror images of each other. Therefore, details of the second manifold plate 50 will not be described in detail below. The second manifold plate 50 has a fuel gas supply hole 50a, a cooling water discharge hole 50b, and an oxygen containing gas supply recess 50c, which are defined in an upper portion thereof, and a fuel gas discharge hole 50d, a cooling water supply hole 50e, and an oxygen containing gas discharge recess 50f, which are defined in a lower portion thereof. The oxygen containing gas supply recess 50c and the oxygen containing gas discharge recess 50f are held in communication with each other through an opening 52 which accommodates an oxygen containing gas flow rectifying plate 82, described later on. The second manifold plate 50 also has holes 51a–51c, 51d–51f defined in opposite side regions thereof and serving as the circulatory passages 29a, 29b.

Figure 7:
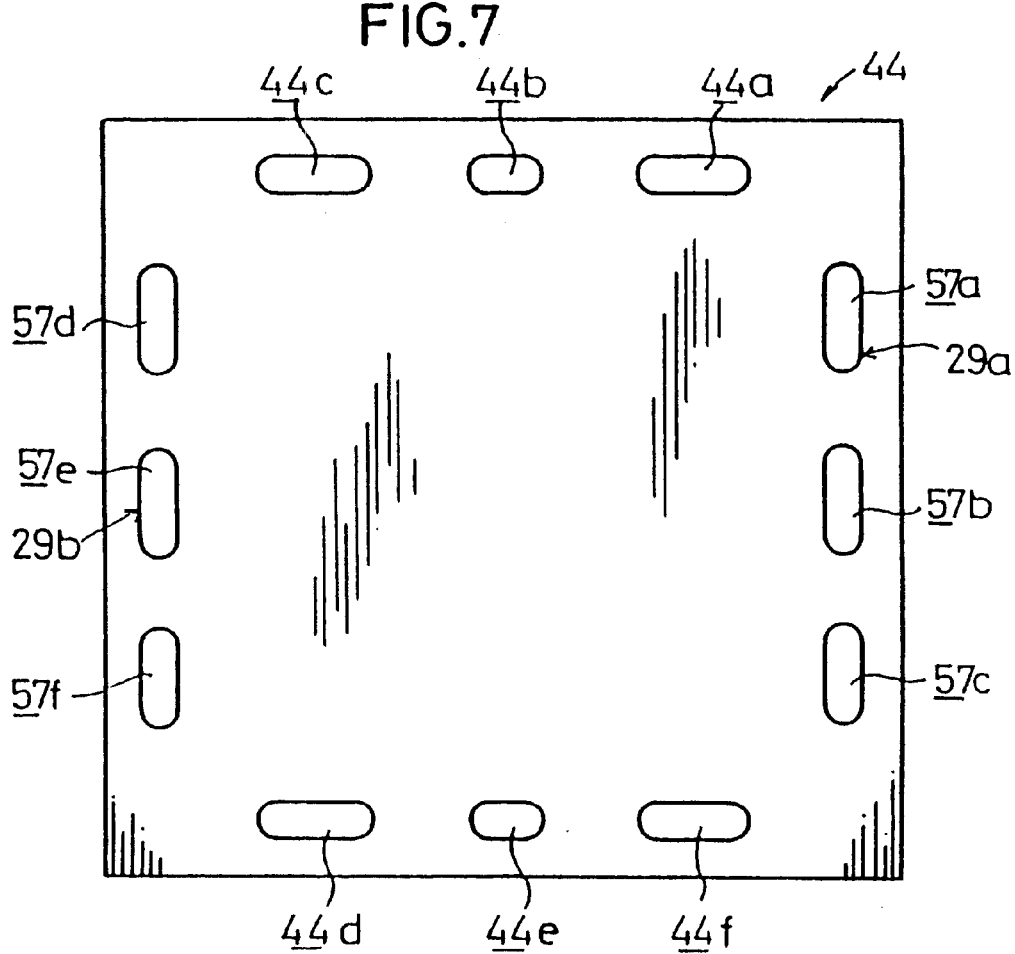
FIG. 7 is a front elevational view of a surface pressure generating plate of the fuel cell.

As shown in FIG. 7, the first surface pressure generating plate 44 that is held against the first manifold plate 42 comprises a flat plate made of an electrically conductive material or is formed integral with or made of the same material as the fuel gas flow rectifying plate 80, described later on. The first surface pressure generating plate 44 has a fuel gas supply communication hole 44a held in communication with the fuel gas supply recess 42a in the first manifold plate 42, a cooling water discharge communication hole 44b held in communication with the cooling water discharge hole 42b, and a communication hole 44c held in communication with the oxygen containing gas supply hole 42c, the holes 44a, 44b, 44c being defined in an upper portion of the first surface pressure generating plate 44. The first surface pressure generating plate 44 further has a communication hole 44d held in communication with the fuel gas discharge recess 42d in the first manifold plate 42, and a communication hole 44e held in communication with the cooling water supply hole 42e, and a communication hole 44f held in communication with the oxygen containing gas discharge hole 42f. The first surface pressure generating plate 44 also has holes 57a–57c, 57d–57f defined in opposite side regions thereof and held in communication with the holes 43a–43c, 43d–43f in the first manifold plate 42. The second surface pressure generating plate 46 is of essentially the same structure as the first surface pressure generating plate 44, and will not be described in detail below.

Figure 8:
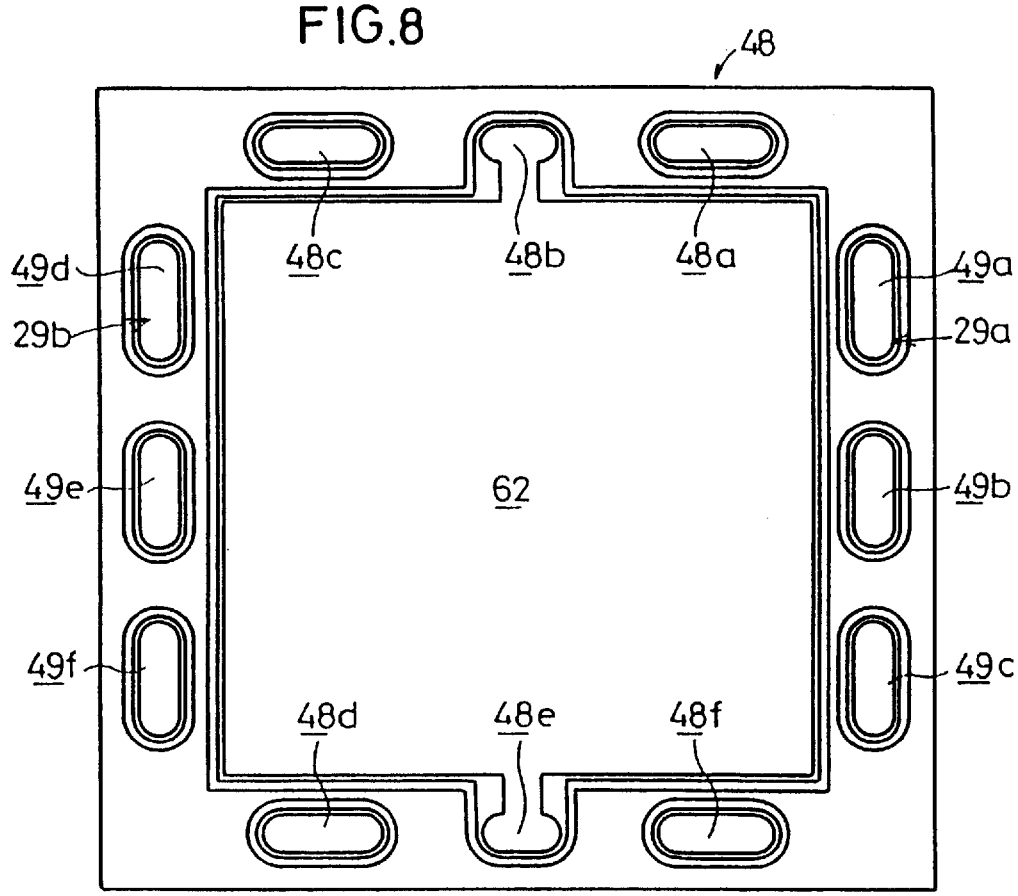
FIG. 8 is a front elevational view of a separator body of the fuel cell.

The separator body 48, as a third manifold plate, serves to supply cooling water upwardly to cool the electric generation section 28. As shown in FIG. 8, the separator body 48, which is relatively thick, is made of an electrically conductive dense material (solid). The separator body 48 has a fuel gas supply hole 48a defined in an upper right corner thereof and held in communication with the recess 42a in the first manifold plate 42 and the communication hole 44a in the first surface pressure generating plate 44, for supplying the fuel gas. The separator body 48 also has a cooling water discharge recess 48b defined in a substantially central upper portion thereof adjacent to the fuel gas supply hole 48a and held in communication with the cooling water discharge hole 42b in the first manifold plate 42 and the communication hole 44b in the first surface pressure generating plate 44. The separator body 48 further has an oxygen containing gas supply hole 48c defined in an upper left corner thereof and held in communication with the oxygen containing gas supply hole 42c in the first manifold plate 42 and the communication hole 44c in the first surface pressure generating plate 44.

The separator body 48 also has a hole 48d defined in a lower left corner thereof and held in communication with the fuel gas discharge recess 42d in the first manifold plate 42 and the communication hole 44d in the first surface pressure generating plate 44, and a cooling water supply recess 48e directly below the cooling water discharge recess 48b. The separator body 48 also has an oxygen containing gas discharge hole 48f defined in a lower right corner thereof. The recesses 48b, 48e communicate with each other through a large opening 62. The separator body 48 further has holes 49a–49c, 49d–49f defined in opposite side regions thereof and held in communication with the holes 43a–43c, 43d–43f in the first manifold plate 42 and the holes 57a–57c, 57d–57f in the first surface pressure generating plate 44.

Cooling water flow rectifying plates 70, 72 are fitted and fixed in the opening 62 in the separator body 48. The combined thickness of the cooling water flow rectifying plates 70, 72 is essentially the same as the thickness of the separator body 48. The cooling water flow rectifying plate 70 has a plurality of parallel grooves 70a extending vertically in FIG. 2. Likewise, the cooling water flow rectifying plate 72 has a plurality of parallel grooves 72a. When the cooling water flow rectifying plates 70, 72 are combined with each other, the grooves 70a, 72a jointly define large cooling water flow rectifying passages (cooling passages) which are held in communication with the recess cooling water discharge recess 48b and the cooling water supply recess 48e, respectively.

As shown in FIG. 2, the fuel gas flow rectifying plate 80 is fitted in the opening 45 in the first manifold plate 42. The fuel gas flow rectifying plate 80 has a flat surface and an opposite surface having a plurality of parallel grooves 80a defined therein and extending vertically. The parallel grooves 80a provide communication between the fuel gas supply recess 42a and the fuel gas discharge recess 42d.

The oxygen containing gas flow rectifying plate 82 is fitted in the opening 52 in the second manifold plate 50. The oxygen containing gas flow rectifying plate 82 has a flat surface and an opposite surface having a plurality of parallel grooves 82a defined therein and extending vertically. The parallel grooves 82a provides communication between the oxygen containing gas supply recess 50c and the oxygen containing gas discharge recess 50f. The thickness of the first manifold plate 42 and the fuel gas flow rectifying plate 80, and the thickness of the second manifold plate 50 and the oxygen containing gas flow rectifying plate 82 are essentially the same as each other.

The separator body 48 thus constructed is sandwiched by the first surface pressure generating plate 44 and the second surface pressure generating plate 46, which are in turn sandwiched by the first manifold plate 42 and the second manifold plate 50. The second gasket 32 is held against the first manifold plate 42, and the first gasket 30 is held against the second manifold plate 50, with the electric generation section 28 sandwiched between the gaskets 30, 32, thus making up the fuel cell 20.

Many fuel cells 20, each comprising the first manifold plate 42 with the flow rectifying plate 80 assembled therein, the second gasket 32, the anode electrode 26, the solid polymer electrolyte membrane 22, the cathode electrode 24, the first gasket 30, the second manifold plate 50 with the flow rectifying plate 82 assembled therein, the second surface pressure generating plate 46, the separator body 48 with the flow rectifying plates 70, 72 assembled therein, and the first surface pressure generating plate 44, which are arranged in the direction indicated by the arrow in FIG. 2, are stacked together. One end of the stack is held against a first end plate 84, and the other end of the stack is held against a second end plate 86. The first and second end plates 84, 86 are fastened to each other by stud bolts 87 (see FIG. 1).

The first end plate 84 has a groove 84a defined therein for dividing the cooling water into left and right flows, the groove 84a facing the cooling water discharge hole 42b in the first manifold plate 42. The groove 84a has opposite ends facing the holes 43a, 43d in the first manifold plate 42. The first end plate 84 has grooves 84b, 84c defined in respective opposite regions thereof and providing communication between the holes 43b, 43c in the first manifold plate 42 and also between the holes 43e, 43f therein. The first end plate 84 further has a through hole 84d defined therein for introducing the oxygen containing gas and a through hole 84e defined therein for discharging the oxygen containing gas.

The second end plate 86 has a through hole 86a defined therein and held in communication with the fuel gas supply hole 50a in the second manifold plate 50, for supplying the fuel gas, a through hole 86b defined therein and held in communication with the cooling water supply hole 50e, a through hole 86c defined therein and held in communication with the fuel gas discharge hole 50d, and through holes 86d, 86e defined therein and held in communication with the holes 51c, 51f (see FIG. 1). The second end plate 86 also has grooves 88a, 88b defined in an inner surface thereof which faces the second manifold plate 50 and providing communication between the holes 51a, 51b in the second manifold plate 50 and also between the holes 51d, 51e therein.

Operation of the fuel cell 10 thus constructed will be described below.

Plural fuel cells 20 are sandwiched between separators 40, stacked such that their communication holes, holes, and recesses held in communication with each other, and fixed by the first and second end plates 84, 86.

When the fuel gas (hydrogen gas) is supplied from the through hole 86a in the second end plate 86 into the fuel cell 10, the fuel gas is supplied from the fuel gas supply hole 50a in the second manifold plate 50 into the fuel gas supply recess 42a in the first manifold plate 42, and then supplied through the grooves 80a in the fuel gas flow rectifying plate 80 disposed in the opening 45 held in communication with the fuel gas supply recess 42a, to the anode electrode 26 of the electric generation section 28.

The oxygen containing gas (air) is supplied from the through hole 84d in the first end plate 84 into the fuel cell 10, and flows through the oxygen containing gas supply hole 42c in the first manifold plate 42 and the oxygen containing gas supply hole 48c in the separator body 48 into the oxygen containing gas supply recess 50c in the second manifold plate 50. The oxygen containing gas passes from the oxygen containing gas supply recess 50c through the grooves 82a in the oxygen containing gas flow rectifying plate 82 to the cathode electrode 24.

The unused fuel gas is discharged through the fuel gas discharge recess 42d in the first manifold plate 42 out of the fuel cell 10 from the through hole 86c in the second end plate 86. An unused oxygen containing gas is discharged through the oxygen containing gas discharge recess 50f in the second manifold plate 50 out of the fuel cell 10 from the through hole 84e in the first end plate 84.

The cooling water is supplied from the through hole 86b in the second end plate 86 into the fuel cell 10, and flows through the cooling water supply hole 50e in the second manifold plate 50 into the cooling water supply recess 48e in the separator body 48. The cooling water then flows upwardly along the cooling water flow rectifying passages defined between the cooling water flow rectifying plate 70, 72 fixedly fitted in the opening 62 in the separator body 48, absorbs heat generated by the electric generation section 28, thereby cooling the electric generation section 28, and thereafter flows from the cooling water discharge recess 48b in the separator body 48 toward the first end plate 84.

The cooling water which has been used to remove the heat from the electric generation section 28 flows from the groove 84a in the first end plate 84 through the circulatory passages 29a, 29b, and is discharged out of the fuel cell 10 from the through holes 86d, 86e in the second end plate 86. Therefore, the cooling water introduced in the groove 84a in the first end plate 84 is supplied to the holes 43a, 43d in the first manifold plate 42 which serve as the circulatory passages 29a, 29b.

The cooling water supplied into the hole 43a in the first manifold plate 42 flows through the hole 49a in the separator body 48 and the hole 51a in the second manifold plate 50 into the groove 88a in the second end plate 86. The cooling water is then introduced through the hole 51b in the second manifold plate 50 which is held in communication with the groove 88a, the hole 49b in the separator body 48, and the hole 43b in the first manifold plate 42 into the groove 84b in the first end plate 84. Then, the cooling water flows from the groove 84b through the hole 43c in the first manifold plate 42, the hole 49c in the separator body 48, and the hole 51c in the second manifold plate 50, and is discharged out of the fuel cell 10 from the through hole 86d in the second end plate 86.

The cooling water which has been supplied from the groove 84a in the first end plate 84 into the circulatory passage 29b flows through the hole 43d in the first manifold plate 42, the hole 49d in the separator body 48, and the hole 51d in the second manifold plate 50 into the groove 88b in the second end plate 86, and thereafter returns through the holes 51e, 49e, 43e into the groove 84c in the first end plate 84. The cooling water is discharged through the holes 43f, 49f, 51f which are held in communication with the groove 84c out of the fuel cell 10 from the through hole 86e in the second end plate 86.

Figure 9:
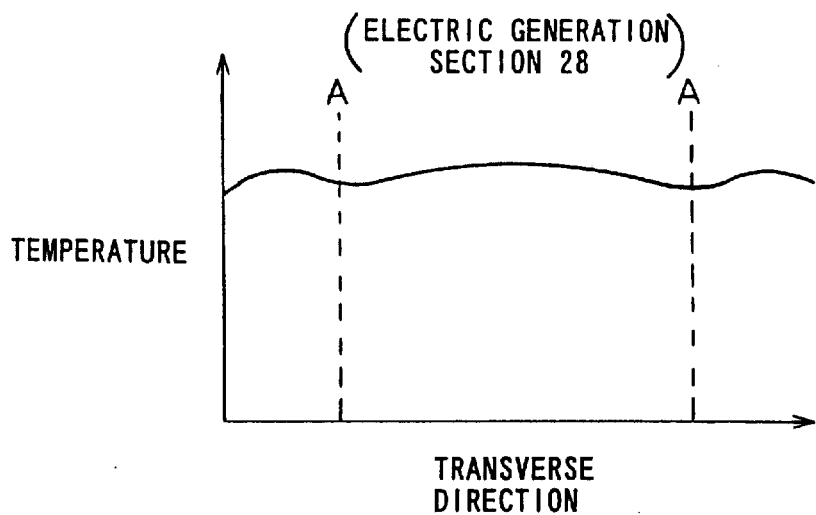
FIG. 9 is a diagram illustrative of a lateral temperature distribution in the electric generation section of the fuel cell.

In this embodiment, as described above, the cooling water which has been supplied to the fuel cell 10 and removed the heat from the electric generation section 28 circulates along the circulatory passages 29a, 29b on the opposite sides of the electric generation section 28. Consequently, on the opposite sides of the electric generation section 28, the cooling water whose temperature has been increased by a heat exchange in the electric generation section 28 flows along the circulatory passages 29a, 29b for thereby preventing the electric generation section 28 in the vicinity of its opposite edges from being lowered in temperature (see FIG. 9).

As a consequence, any temperature difference between a central region of the electric generation section 28 and opposite edges thereof is minimized, thereby preventing moisture condensation on the opposite edges of the electric generation section 28 due to a temperature drop. Therefore, the electric generation section 28 is free of inoperative regions which would otherwise be caused by moisture condensation, and any low-performance regions of the electric generation section 28 due to low temperatures are reduced. Thus, the effective operative area and performance of the electric generation section 28 are effectively increased.

According to this embodiment, furthermore, the fuel cell 10 is only required to have the circulatory passages 29a, 29b therein for circulating the cooling water which has absorbed heat through a heat exchange along the opposite outer sides of the electric generation section 28. The fuel cell 10 is not complicated in overall structure, and can easily and economically be constructed.

Figure 10:
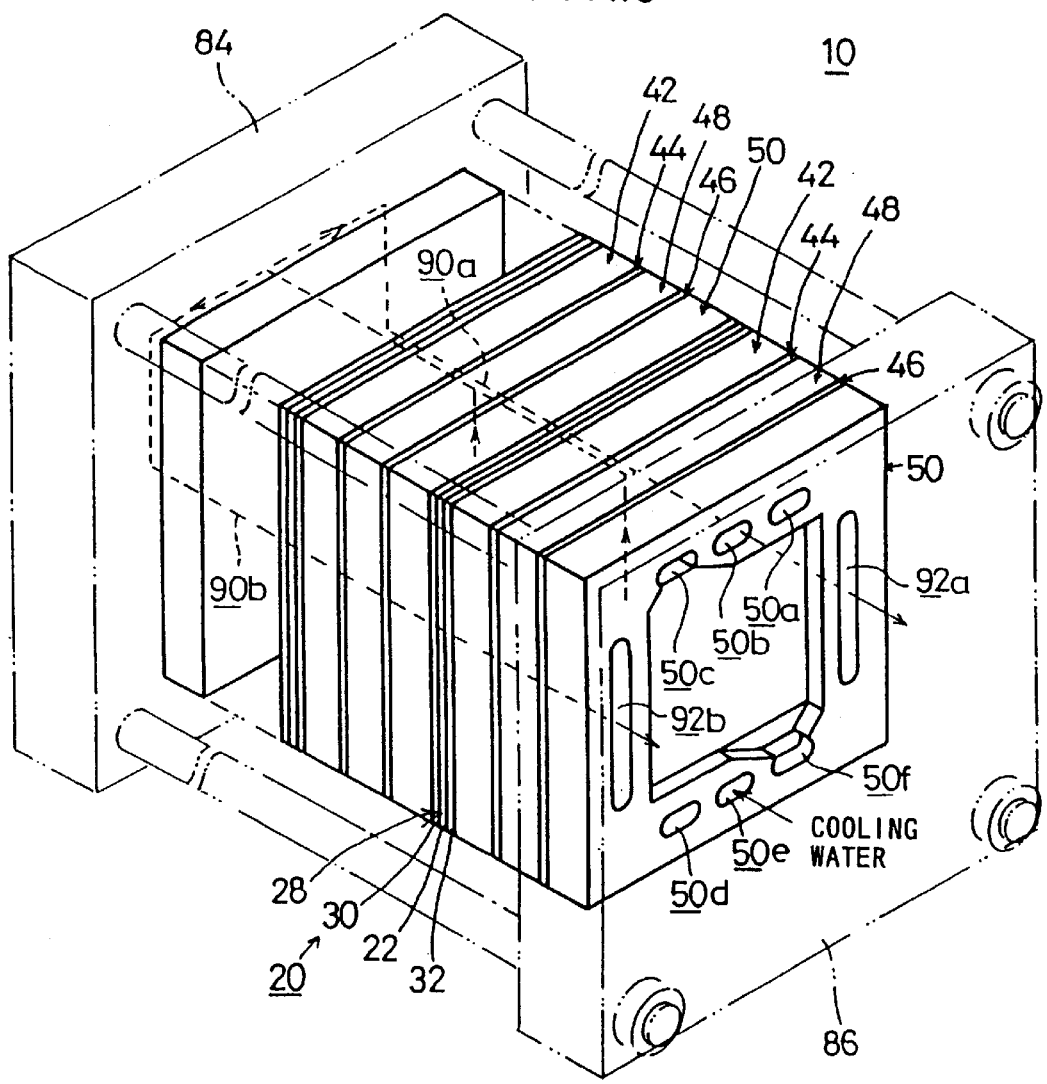
FIG. 10 is a fragmentary perspective view of a fuel cell, showing another arrangement of circulatory passages.
Figure 11:
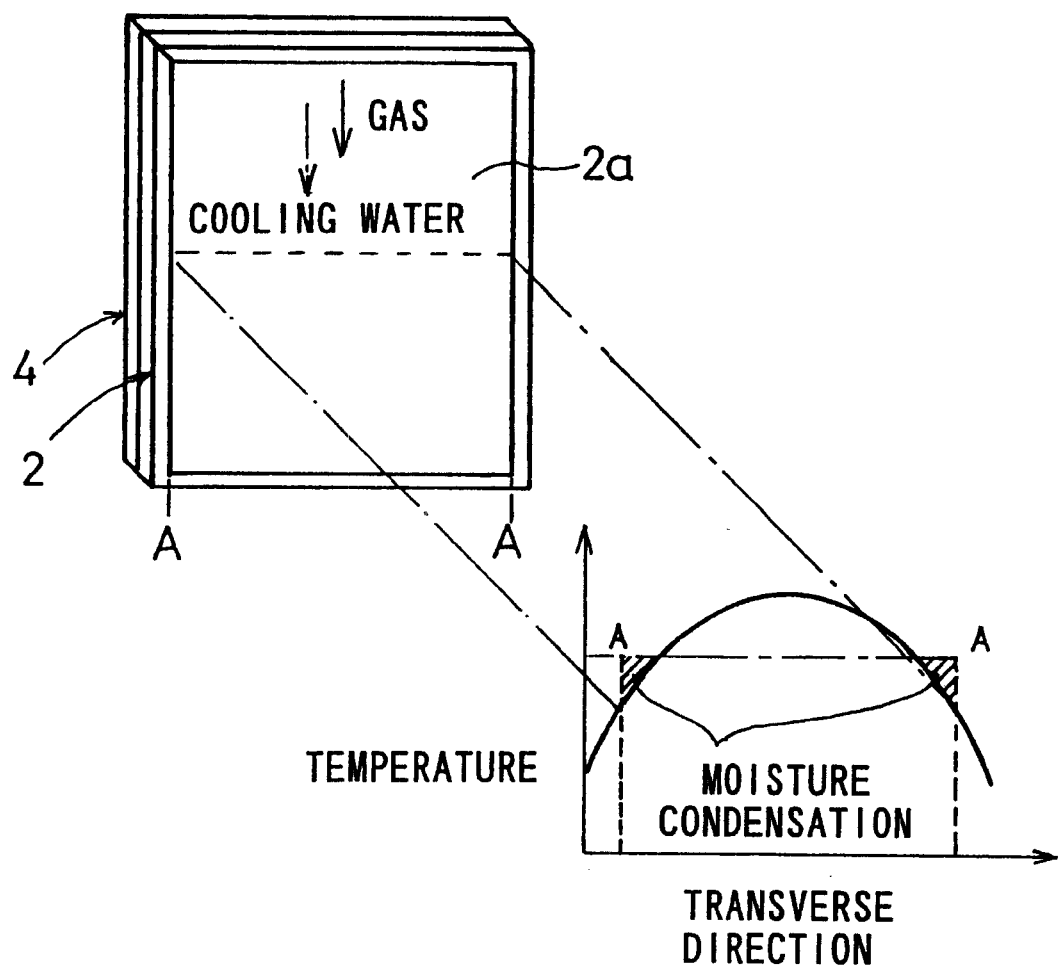
FIG. 11 is a diagram illustrative of a lateral temperature distribution in an electric generation section of a conventional fuel cell.

In the present embodiment, the circulatory passages 29a, 29b pass three times on the opposite sides of the electric generation section 28 (one and a half reciprocating cycle on each side). However, the fuel cell 10 may have circulatory passages 90a, 90b shown in FIG. 10. The circulatory passages 90a, 90b are provided by oblong holes 92a, 92b defined as vertically elongate holes in respective opposite sides of the second manifold plate 50. The first manifold plate 42, the second gasket 32, the solid polymer electrolyte membrane 22, the first gasket 30, the second surface pressure generating plate 46, the separator body 48, and the first surface pressure generating plate 44 have vertically elongate oblong holes (not shown) defined in opposite sides thereof and held in communication with each other.

The circulatory passages 90a, 90b circulate cooling water, which has been used to remove heat from the electric generation section 28 and sent to the first end plate 84, through the vertically elongate oblong holes 92a, 92b, and then discharge the cooling water out of the fuel cell 10. Therefore, the circulatory passages 90a, 90b are capable of regulating the temperatures of the opposite sides of the electric generation section 28 together in the vertical direction, and also offer the same advantages as those of the circulatory passages 29a, 29b.

In the fuel cell according to the present invention, a cooling medium whose temperature is relatively high due to a heat exchange at an electric generation section is circulated along the outer sides of the electric generation section to prevent a partial temperature difference from being developed in the electric generation section. Therefore, moisture condensation is prevented, and the effective operative area and performance of the electric generation section are increased.

What is claimed is:

1. A method of cooling a fuel cell having an electric generation section with an electrolyte membrane sandwiched between an anode electrode plate and a cathode electrode plate, comprising the steps of:

first, passing a cooling medium in a first direction that is parallel to and in heat exchange relationship with at least one of the electrode plates on a side opposite the electrolyte membrane for cooling the electric generating section of the fuel cell; and second, passing the cooling medium used in the first step in a second direction through both lateral outer sides of the electrical generation section, wherein the second direction is perpendicular to the first direction.

2. The method of claim 1, wherein the electrode plates of the electric generation section are arranged vertically and the cooling medium is passed vertically in an upward direction in said first step.

3. The method of claim 1 or 2, wherein the second step includes passing the cooling medium in a third direction perpendicular to the electric generation section, wherein the third direction is the reverse of the second direction.

4. The method of claim 3, wherein the cooling medium passing in the second direction is below the cooling medium passing in the first direction.

5. The method of claim 3, wherein the second step includes passing the cooling medium in a third direction perpendicular to the electric generation section, which third direction is the same as the first direction.

6. The method of claim 4, wherein the second step includes passing the cooling medium in a third direction perpendicular to the electric generation section, which third direction is the same as the first direction.

7. The method of claim 6, wherein the cooling medium passing in the third direction is below the cooling medium passing in the second direction.

8. The method of claim 1, wherein the first step includes passing the cooling medium parallel to and in heat exchange relationship with both the anode electrode plate and the cathode electrode plate and in the same direction.

9. The method of claim 8, wherein said same direction of cooling medium flow is opposite to a direction of flow of a fuel gas and an oxygen gas along the anode electrode plate and the cathode electrode plate, respectively.

10. The method of claim 1 wherein the electrolyte membrane comprises a solid polymer electrolyte membrane.

11. A method of cooling a fuel cell having an electric generation section with an electrolyte membrane sandwiched between an anode electrode plate and a cathode electrode plate, comprising the step of passing a cooling medium in a first direction through both lateral outer sides of the electric generation section.

12. The method of claim 11, wherein said cooling medium flows through a fuel cell stack such that the flowing direction of the cooling medium changes a plurality of times alternately at each of opposite ends of said fuel cell stack.

13. A method of cooling a fuel cell having an electric generation section with an electrolyte membrane sandwiched between an anode electrode plate and a cathode electrode plate, comprising the steps of:

first, passing a cooling medium in a first direction that is parallel to and in heat exchange relationship with at least one of the electrode plates on a side opposite the electrolyte membrane for cooling all of the electric generating section of the fuel cell; and second, passing the cooling medium used in the first step in a second direction through both lateral outer sides of the electrical generation section, wherein the second direction is perpendicular to the first direction.

* * * * *